(12) United States Patent
Hubbell

(10) Patent No.: US 7,425,075 B1
(45) Date of Patent: Sep. 16, 2008

(54) OPTICAL REFLECTING MATERIAL

(76) Inventor: David A. Hubbell, 1600 Governors Dr., #128, Pensacola, FL (US) 32514

( * ) Notice: Subject to any disclaimer, the term of this patent is extended or adjusted under 35 U.S.C. 154(b) by 224 days.

(21) Appl. No.: 11/044,723

(22) Filed: Jan. 28, 2005

Related U.S. Application Data

(60) Provisional application No. 60/546,632, filed on Feb. 21, 2004, provisional application No. 60/539,924, filed on Jan. 28, 2004.

(51) Int. Cl.
*G02B 5/124* (2006.01)

(52) U.S. Cl. .................... 359/530; 359/529

(58) Field of Classification Search ............... None
See application file for complete search history.

(56) References Cited

U.S. PATENT DOCUMENTS

| | | | |
|---|---|---|---|
| 113 | A | 1/1837 | Austin |
| 1,662 | A | 6/1840 | Norris |
| 3,496 | A | 3/1844 | Grout et al. |
| 14,267 | A | 2/1856 | Hoff |
| 21,050 | A | 7/1858 | Hyatt |
| RE1,249 | E | 12/1861 | Frink |
| 34,079 | A | 1/1862 | Ward |
| 35,507 | A | 6/1862 | Colburn |
| 46,897 | A | 3/1865 | Hagadorn |
| 55,054 | A | 5/1866 | Brown et al. |
| 55,436 | A | 6/1866 | Witsil |
| 55,450 | A | 6/1866 | Appleby |
| 55,523 | A | 6/1866 | Morawetz et al. |
| 59,438 | A | 11/1866 | Morawetz |
| 60,129 | A | 12/1866 | Blair |
| 76,334 | A | 4/1868 | Markland, Jr. |
| 82,389 | A | 11/1868 | Demuth |
| 106,764 | A | 8/1870 | Austin |
| 133,735 | A | 12/1872 | Wigley |
| 162,144 | A | 4/1875 | Billingham |
| 170,444 | A | 11/1875 | Lilliendahl |
| 235,913 | A | 12/1880 | Spalding |
| 281,536 | A | 7/1883 | Louch |
| 285,270 | A | 9/1883 | Jaeger |
| 293,702 | A | 2/1884 | Banning |
| 327,362 | A | 9/1885 | Watson |
| 413,636 | A | 10/1889 | Van Gestel |
| 420,675 | A | 2/1890 | Cocheu |
| 472,050 | A | 4/1892 | Hofheimer |
| 529,073 | A | 11/1894 | Hoskins |
| 566,553 | A | 8/1896 | Wright |
| 581,093 | A | 4/1897 | Weeks |
| 586,775 | A | 7/1897 | Larzelere |
| 619,849 | A | 2/1899 | Spencer |
| 673,647 | A | 5/1901 | Meacham |
| 700,836 | A | 5/1902 | Scott |
| 704,122 | A | 7/1902 | Scott |
| 752,429 | A | 2/1904 | Wadsworth |
| 769,348 | A | 9/1904 | Junghans |

(Continued)

*Primary Examiner*—James Phan
(74) *Attorney, Agent, or Firm*—Shlesinger, Arkwright & Garvey LLP

(57) ABSTRACT

A reflecting plate material, comprises a urethane plate having first and second opposite major surfaces. The first major surface is planar and the second major surface is formed with a plurality of cube corners each one of which has a plurality of facets. The facets are clouded to provide degraded retro-reflecting characteristics at less than those with clear facets, thereby diffusing light across the surfaces.

2 Claims, 7 Drawing Sheets

U.S. PATENT DOCUMENTS

| | | | |
|---|---|---|---|
| 770,068 A | 9/1904 | Hofheimer | |
| 788,050 A | 4/1905 | Johnson | |
| 798,191 A | 8/1905 | Lamb | |
| 835,648 A | 11/1906 | Straubel | |
| 853,083 A | 5/1907 | Hasty | |
| 897,174 A | 8/1908 | Staubel | |
| 926,956 A | 7/1909 | McComb | |
| 927,018 A | 7/1909 | Ammen | |
| 947,127 A | 1/1910 | Roberts | |
| 1,004,503 A | 9/1911 | Troy | |
| 1,128,979 A | 2/1915 | Hess | |
| 1,139,723 A | 5/1915 | Rich, Jr. | |
| 1,146,361 A | 7/1915 | Spencer et al. | |
| 1,351,562 A | 8/1920 | Foster | |
| 1,364,916 A | 1/1921 | Carse | |
| 1,377,161 A | 5/1921 | Vanderbeek | |
| 1,440,096 A | 12/1922 | Murray | |
| 1,475,430 A | 11/1923 | Curwen | |
| 1,479,485 A | 1/1924 | Van Bloem | |
| 1,562,835 A | 11/1925 | Kuttler | |
| 1,636,970 A | 7/1927 | Sulzberger | |
| 1,671,086 A | 5/1928 | Stimson | |
| 1,691,708 A | 11/1928 | Egleson | |
| 1,701,204 A | 2/1929 | Glatzner | |
| 1,707,965 A | 4/1929 | Scantlebury | |
| 1,800,673 A | 4/1931 | Bruckner | |
| 1,813,491 A | 7/1931 | Gillard | |
| RE18,166 E | 8/1931 | Stimson | |
| 1,874,138 A | 8/1932 | Stimson | |
| 2,029,375 A | 2/1936 | James | |
| 2,067,701 A | 1/1937 | James | |
| 2,167,149 A | 7/1939 | Grote | |
| 2,205,638 A | 6/1940 | Stimson | |
| 2,310,790 A | 2/1943 | Jungersen | |
| 2,354,048 A | 7/1944 | Palmquist | |
| 2,444,533 A | 7/1948 | Richardson | |
| 3,140,340 A | 7/1964 | Weber | |
| 3,258,840 A | 7/1966 | Hedgewick et al. | |
| 3,684,348 A | 8/1972 | Rowland | |
| 3,889,147 A | 6/1975 | Groves | |
| 4,298,869 A | 11/1981 | Okuno | |
| 4,329,625 A | 5/1982 | Nishizawa et al. | |
| 4,729,076 A | 3/1988 | Masami et al. | |
| 4,747,981 A * | 5/1988 | Robinson | 264/1.9 |
| 4,805,984 A | 2/1989 | Cobb, Jr. | |
| 4,906,070 A | 3/1990 | Cobb, Jr. | |
| 5,452,532 A | 9/1995 | Nishio | |
| 5,457,450 A | 10/1995 | Deese et al. | |
| 5,561,346 A | 10/1996 | Byrne | |
| 5,654,825 A | 8/1997 | Milton | |
| 5,661,645 A | 8/1997 | Hochstein | |
| 5,729,214 A | 3/1998 | Moore | |
| 5,759,671 A | 6/1998 | Tanaka et al. | |
| 5,782,555 A | 7/1998 | Hochstein | |
| 5,917,431 A | 6/1999 | Sanada et al. | |
| 5,925,437 A | 7/1999 | Nelson | |
| 6,013,346 A | 1/2000 | Lewis et al. | |
| 6,072,407 A | 6/2000 | Shin | |
| 6,083,607 A | 7/2000 | Mimura et al. | |
| 6,139,158 A * | 10/2000 | Nilsen et al. | 359/530 |
| 6,147,623 A | 11/2000 | Rippen | |
| 6,164,782 A | 12/2000 | Pojar | |
| 6,198,410 B1 | 3/2001 | White et al. | |
| 6,243,644 B1 | 6/2001 | Dengler | |
| 6,259,375 B1 | 7/2001 | Andras | |
| 6,422,714 B1 | 7/2002 | Hubbell | |
| 6,676,279 B1 | 1/2004 | Hubbell et al. | |
| 6,685,154 B1 | 2/2004 | Blyth et al. | |
| 6,705,744 B2 | 3/2004 | Hubbell et al. | |

* cited by examiner

Illinois DOT, Division of Highways, DOT Lab Test, Springfield

Specification For Prismatic
Retroreflective Sheeting For
Highway Signs T-36-01
(effective February 1, 2001)
Page 8

Minimum Coefficient of Retroreflection
Candellas per Lux per Sq. M. of Material
Observation Angle 0.2 Degrees
Entrance Angle 4.0 Degrees
(1-7 yrs.)

| SHEETING TYPE | white | yellow | red | green | blue |
| --- | --- | --- | --- | --- | --- |
| AA* | 640 | 525 | 170 | 64 | 34 |
| AZ* | 295 | 240 | 78 | 36 | 17 |
| AP* | 210 | 145 | 30 | 30 | 17 |
| INJECTION MOLD RETRO-REFLECTIVE PLATES | 1041** | 910** | 272** | 217** | 66** |

\* values are for sheeting material, not transparent colors screened on white sheeting, all transparent colors screened on white sheeting exhibit significantly lower values.

\*\* State of Illinois, DOT Lab Test results

FIG. 1

OPTICAL REFLECTING MATERIAL

RELATED U.S. APPLICATION DATA

This application claims the benefit of provisional application Ser. Nos. 60/539,924, filed Jan. 28, 2004 and 60/546,632, filed Feb. 21, 2004.

FIELD OF THE INVENTION

The present invention relates in general to optical reflecting material and in particular to a dimensionally large, seamless cube-corner retro-reflective plate material made of urethane for the construction of highway signing where the sign face is retro-reflective, and a process for making the material.

BACKGROUND OF THE INVENTION

To meet governmental materials requirements for highway signs and/or signals, such as those usually encountered on the National Highway System (NHS), the signs and/or signals are required to meet certain performance characteristics. One of those performance characteristics is the ability to return or reflect light from a source back in the general direction of the source. Various patents exist that disclose materials or devices that provide this performance characteristic. Examples are disclosed in U.S. Pat. No. 106,764 (a kind of glass which transmits a fraction of its light and reflects the greater part), U.S. Pat. No. 235,913 (reflector, so arranged, intercepts the rising ray of light and reflects them angularly downward), U.S. Pat. No. 835,648 (triple reflector), U.S. Pat. No. 1,415,595 (light reflecting prism), U.S. Pat. No. 1,591,572 (central triple reflectors), U.S. Pat. No. 2,067,701 (double mirror), U.S. Pat. No. 2,167,149 (cube corner prism), U.S. Pat. No. 2,354,048 (reflexive reflection), and U.S. Pat. No. 2,432,896 (retro-reflective).

There are two types of commercially available retro-reflective materials used on the NHS; namely, laminated-sheet product and injection-molded plate made of glass or plastic. Both products require significant capital equipment to manufacture.

The retro-reflective laminated-sheet material is available in long length rolls usually 48" wide. This product includes sheet or film mounted micro-reflective elements, such as glass beads or small, relative to sheet thickness, prismatic elements. This product is usually provided to sign manufacturers in rolls. The sign manufacturer unrolls and cuts the desired sheet length which is then glued to a substrate such as plywood or sheet aluminum. The Minnesota Mining and Manufacturing Company sells a similar product under the trademark SCOTCHLITE and includes minute glass spheres embedded in a matrix of synthetic resin to provide retro-reflection. The laminated-sheet material is not structurally self-supporting and is required to be adhered to a structurally self-supporting substrate. Typically, the laminated-sheet product, relative to the injection-molded plate product, has a short service-life due to progressive degradation of retro-reflective performance characteristics when exposed to NHS roadside environmental conditions. Examples of laminated-sheet products are disclosed in U.S. Pat. Nos. 2,310,790; 2,354,048; and 3,684,348.

The other type of retro-reflective material is injection molded plates having cube corner formations on one surface thereof, such molded plates being formed from glass or synthetic plastic. Cube corner reflectors molded from glass and more recently from acrylic resins have commonly been employed as safety devices on bicycles, automobiles and other vehicles. They are generally rigid, which do not lend themselves either to shaping to various substrates of nonplanar character. Making them thinner to make them more flexible would reduce the size of the cube corner formations, which makes criticality in control of angles and dimensions to be far more acute since even a minute deviation will produce a substantial deviation in the capability of the material to retro-reflect light rays impinging thereon. Examples of retro-reflective injection-molded plate products are disclosed in U.S. Pat. Nos. 1,800,673 and 2,205,638.

The retro-reflective injection-molded plate material is significantly smaller length/width dimensionally than the laminated sheet product. Typical sizes are 2"×3", 4"×6", 6"×12" and 30"×30". The bigger the size, the more expensive is the required mold and the attendant maintenance. The injection-molded plate, in application, is structurally self-supporting.

Both retro-reflective products have technological disadvantages for the governmental agencies which purchase a majority of the retro-reflective highway sign products in the United States. Four of the aforementioned disadvantages of the prior art are:

1) the sheet or film product's retro-reflective properties degrade relatively quickly, vis-à-vis the polycarbonate or acrylic injection molded product over time, due in part to its exposure to sunlight, due in part to its exposure to aggressive air content such as smog, and due in part to physical abrasions such as wind-laden sand or dirt, said degradation being highly site-specific. As such, government traffic engineers cannot predict in advance the level of retro-reflectivity a specific highway sign will have after a relatively short time of in-service. For example, if two otherwise identical highway signs using the sheet retro-reflective means, are placed next to each other, exposed to sunlight in the United States, with one facing north and the other facing south, all other factors remaining constant, the sign face oriented south will show significantly greater degradation over a short period of time then its identical companion sign which is oriented north. The degradation is, for the most part, due to exposure from UV radiation from sunlight.

2) one of the disadvantages of polycarbonate or acrylic cube-corner retro-reflective plates for highway signs is the present cost associated with highway sign sized injection molded parts. These signs are relatively large. For example, a standard stop sign is 36"×36", an exit ramp sign 60"×60" and overhead guide signs about 12-15' long by 10-12' high. Thus, the size requirement means that the prior art of manufacturing highway sign size cube-corner elements requires relatively expensive capital equipment making the individual sign, significantly more expensive than the sheet-faced highway sign. The one significant advantage that a polycarbonate or acrylic cube-corner retro-reflective highway sign has over the sheet-faced highway sign is that the polycarbonate cube-corner highway sign's retro-reflective properties, all the aforementioned factors remaining constant, degrade at a significantly slower rate.

3) both prior art means of providing retro-reflectivity to highway signs have the disadvantage of site-specific indeterminate retro-reflective degradation rates. In the case of sheet-faced highway signs, government traffic engineers frequently compensate for retro-reflective degradation by initially providing higher than required retro-reflective rated sheeting so as to provide a guessed at, site-specific, average retro-reflectivity over the service-life of the highway sign in question. In the case of polycarbonate or acrylic cube-corner signs, due primarily to the manufacturing's capital equipment costs, the selection of the level of retro-reflectivity offered is limited. That is, the government traffic engineer has very limited choices of levels of retro-reflectivity when the polycarbonate or acrylic cube-corner means is employed. While the polycarbonate or acrylic cube-corner degradation is much slower than the sheet-faced means, the traffic engineer is not able to tailor the site-specific retro-reflective need when using polycarbonate or acrylic cube-corner highway signs. Further, due to the expense of construction, polycarbonate cube-corner highway signs have been built using the polycarbonate or acrylic cube-corner material to provide long service-life retro-reflectivity and overlaying said cube-corner material with transparent and/or semi-transparent sheeting and/or films and/or inks to provide the sign's intended legend or message. Such sheetings, films and/or inks suffer the same quick degradation due to UV, abrasion, etc. and aforementioned.

4) both means of providing retro-reflective highway signs require that a vehicle's headlights illuminate the sign face before the retro-reflective properties can be availed for the benefit of the vehicle's driver. Three conflicting engineering design issues have recently conspired to complicate the government traffic engineer's highway sign selection and utilization due to the need for a vehicle's headlights to illuminate a sign's face. The three issues are:

A) a general need to elevate highway roadside signs such as STOP or YIELD signs, particularly in urban areas due to blocked line-of-sight for drivers who find themselves behind relatively larger vehicles such as delivery trucks, vans and the larger SUVs. That is, to allow a line-of-sight to a highway sign, during daylight hours, recent governmental traffic sign regulations have encouraged the placement of highway signs at higher elevations than that used in the past. By moving highway signs upward, the amount of retro-reflected headlight light and the retro-reflective angle of the reflected light, during nighttime hours is directly, adversely, affected. The design placement of highway signs commonly known as Guide Signs which are usually located on over-the-roadway overhead structures, also known as sign bridges, have also been encouraged to be placed at higher elevations so as to minimize the threat of being impacted by over-height vehicles has also resulted in reduced nighttime retro-reflectivity of sign faces.

B) The recent encouragement, by the U.S. Department of Transportation, for motor vehicle manufacturers to utilize European-style vehicle headlights which tend to project light forward and downward rather than the traditional American-style headlight which tended to cast light forward in a conic projection with the cone's axis, somewhat downward, but providing significant upward illumination, causes even the older highway signs located at lower elevations to be illuminated with far less headlight lighting thus providing less retro-reflected light off the sign face to the vehicle's driver.

C) The prior art of providing permanently fixed illuminating fixtures for highway signs now runs afoul of State and local government environmental laws for the protection of Dark Sky Conservation such as the State of New Mexico's and the State of Arizona's "Outdoor Lighting Control Act" and the City of Las Cruces "Lighting Control Act".

Referring to FIG. 1, noted as "AA", "AZ" & "AP" are the retro-reflective minimum values for the laminated sheets required by government agencies under the specific conditions noted, accounting for known degradation over time, Below the retro-reflective sheet minimum values, on FIG. 1, are the test results for test samples of multiple, large scale injection molded retro-reflective plates. The Illinois Department of Transportation (IDOT), Materials Test Lab results show, referring now to only the highest retro-reflective sheet material, that injection molded retro-reflective plates of similar area provide significantly higher retro-reflection. Specifically, referring to FIG. 1, "white" (also known as "crystal") show injection molded plates at 1041 candellas per lux per sq. m. vs 640 candellas per lux per sq. m. requirements for sheet product.

It should be noted that the individual injection molded retro-reflective plates, making up the large, multi-plate, retro-reflective test plates tested by IDOT were of a geometry disclosed in U.S. Pat. No. 2,205,638 whereby one-half of the units with their maximum range of inclination towards the right and with the other half towards the left, assuming the borders to be vertical. The '638 patent devices, while less efficient in retro-reflecting light directed off center, produce very large retro-reflection observation angles. In fact, applicant observed good retro-reflection, during the IDOT testing, of as much as 80° off-axis and IDOT reported acceptable retro-reflection in excess of 80° off-axis. In sharp contrast, retro-reflective sheeting is usually at best no more than 30° off-axis and the angularity is subject to degradation.

In summary, the placement of highway traffic signing at higher elevations, the encouragement of the use of less-glare-producing European-style headlights for the benefit of oncoming motorists and with the evolving environmental laws restricting the self-illuminating of the signs has resulted in a reduced performance for the prior art of retro-reflective highway sign design, particular the very large green-and-white overhead guide-signs which are exclusively fabricated from retro-reflective sheet mounted on an aluminum structural substrate. Further, the prior art does not provide means and method of allowing the government traffic engineer to design and adjust the amount of retro-reflectivity desirable at a given site-location.

Accordingly, there is a need for an economic retro-reflective molded plate made in accordance with the present invention that will provide the economy of a substrate-mounted retro-reflective laminated-sheet but still exceed the initial retro-reflective laminated-sheet performance requirements and provide the utility of a retro-reflective injection-molded.

It should be understood that the term "sheet" means non-self-supporting, requiring a substrate, such as an aluminum plate, for structural support, and the term "plate" means structurally self-supporting material.

SUMMARY OF THE INVENTION

The present invention is directed to a reflecting plate material, comprising a urethane plate having first and second opposite major surfaces. The first major surface is planar and the second major surface is formed with a plurality of cube corners each one of which has a plurality of facets. The facets are clouded to provide degraded retro-reflecting characteristics at less than those with clear facets, thereby diffusing light across the surfaces.

The present invention is directed to making a retro-reflective plate, comprising:

a) providing a plurality of cube-corner retro-reflective plates;

b) arranging the plates on a substrate in an edge-to-edge formation;

c) coating the plates with a release agent;

d) making a first mold of the plates arranged in step b) with urethane;

e) coating the first mold with a release agent; and f) molding a plate from the first mold using urethane.

BRIEF DESCRIPTIONS OF THE DRAWINGS

FIG. 1 charts tests reports conducted by the Illinois Department of Transportation's (IDOT) Materials Test Lab at Springfield, Ill. for standard injection mold retro-reflective plates in comparison with the minimum retro-reflective requirements of standard retro-reflective sheeting.

DETAILED DESCRIPTION OF THE INVENTION

The present invention provides a large, seamless retro-reflective molded plate, providing the economy and size of a substrate-mounted retro-reflective laminated-sheet and the utility of a retro-reflective injection-molded plate. The large, seamless retro-reflective molded plate of the present invention can have significantly lower retro-reflective performance characteristics than the standard retro-reflective-injection-molded plates but still exceed the initial retro-reflective laminated-sheet material requirements.

Figure 2:
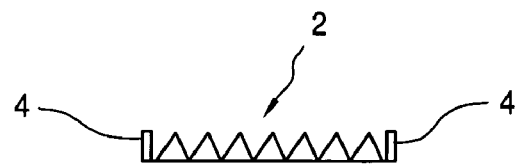
FIG. 2 is a schematic cross-sectional view of standard cube-corner retro-reflective injection-molded plate.
Figure 3:
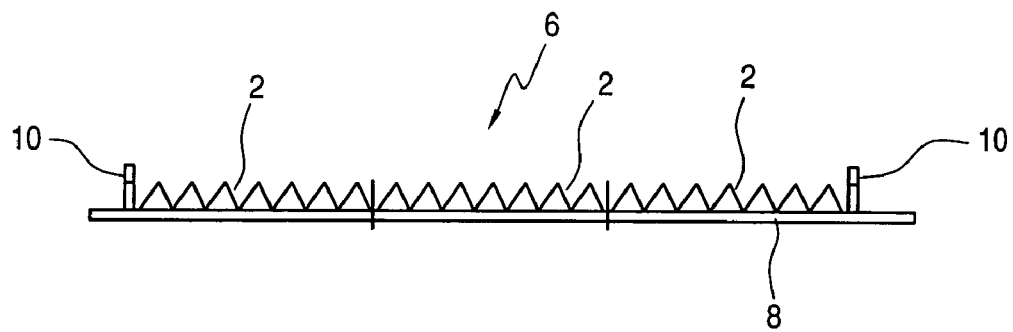
FIG. 3 is a schematic cross-sectional view of a plurality of individual standard retro-reflective plates, with edges removed and ganged together, side-to-side, to form a large retro-reflective plate mold.
Figure 4:
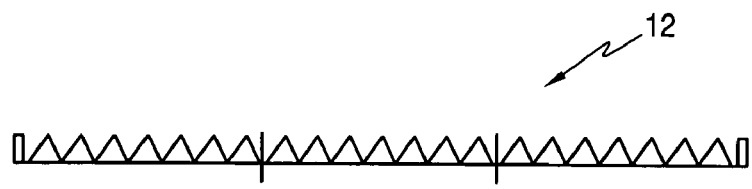
FIG. 4 is a schematic cross-sectional diagram of a mold plate made from the mold of FIG. 3.
Figure 5:
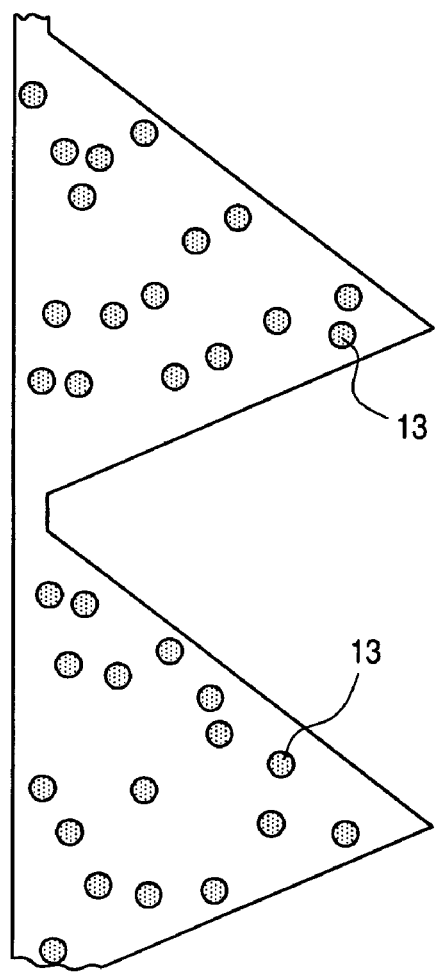
FIG. 5 is an enlarged schematic cross-sectional view of a section of a retro-reflective plate made from the mold of FIG. 4.

Referring to FIG. 2, standard individual polycarbonate or acrylic type cube-corner retro-reflective injection-molded plates, such as plate 2, are usually molded with edges or lips 4. A mold 6 is made from a plurality of the plates 2. The individual retro-reflective plate's edges 4 are removed, using standard means such as a laser cutter or common cutting tool. The edges 4 are not retro-reflective, since they do not include the cube-corner elements. Non-retro-reflective areas are preferably minimized since they can create dark areas on the plate's surface relative to the retro-reflective portions. The trimmed cube-corner plates are placed smooth side down on a structural substrate 8. The plates 2 are ganged together into dimensionally large arrayed structure. The plates may be sonically welded, glued or otherwise attached to the structural substrate 8. Structural substrates may be of fiberglass, polycarbonate, acrylic, wood, steel, or other suitable material. A lip or edge 10 is formed around the grouped cube-corner plates at a height equal to or greater than the desired thickness of the dimensionally large, seamless, cube-corner retro-reflective plate to be formed. A release material or agent is applied to the exposed face and lip of the grouped cube-corner plates. The desired material, preferably urethane or other resin and similar materials, with or without coloring additives, is introduced into the mold 6. Once hardened, a $1^{st}$-descendent-mold 12 is pulled-from the abovementioned large dimensional open mold 6. The mold 12, if transparent/translucent, can be used as a reversed geometry retro-reflective product, providing a dimensionally large, seamless, cube-corner retro-reflective plate. The open mold 12 is a mirror image of the mold 6 and is used to cast large, monolithic, retro-reflective plates, within reasonable tolerance, identical to the trimmed individual molded retro-reflective ganged-together plates 2, having only slightly degraded retro-reflective performance characteristics compared to the original, individually much smaller injection-molded plate product units 2. However, the resultant slightly lower retro-reflective performance of the large, monolithic, retro-reflective plate is still higher than that required of the retro-reflective laminated-sheet product. The product made from the mold 12 is a $2^{nd}$-descendent-mold product.

There are three significant economic advantages to such large, monolithic, retro-reflective plates: 1) replaces the laminated-sheet products which require a substrate to achieve structural self-support; 2) manufacture of such large, monolithic, retro-reflective plates requires none of the extensive capital equipment required of both laminated-sheet and injection-molded plate manufacturing, and, 3) greater flexibility in the design of the final product geometry.

Light-transmissive urethane is preferably used as the casting material to make the large, monolithic, retro-reflective plates. Urethane is an excellent material for this purpose because of its flexibility, toughness, and clarity through wide ranges of temperatures. Urethane is an adhesive, very tenacious material as it hardens. When it is molded the mold must be coated with a release agent in order to successfully remove the urethane article from the mold. However, known release agents generally will destroy the effect of multiple-facet retro-reflective surfacing molded on a urethane article. This is because the optic surface of the reflective facets will be clouded by the mold releasing agents. Prior art teaches that the facets must be precisely planar and uniform, and such surface irregularities will cause diffusion of the light striking the facets, rather than the precisely directed reflection needed in such a reflector. However, the present invention recognizes diffusion in retro-reflective products as a desirable characteristic to spread the reflected light so as to make the reflector visible to an observer located a substantial distance outside of a line connecting the reflector with the light source.

The use of urethane allows the addition of chemical spiking, which encourages contraction or expansion of the urethane casting material as it sets. As the mold 12 constructed from the individual trimmed retro-reflective injection-molded plates need not be inelastic, the sharpness or crispness of the mold facets can be enhanced.

The use of an open mold with the facets on the upper part of the mold allows for the capture during the molding process of entrained air/gases in the individual facet cavities. These individual packets of air/gases become trapped bubbles 13 after the urethane sets. These trapped bubbles provide the same utility of forming small beads on the ridges of facets to improve uniform brightness across the retro-reflective urethane plate.

The retro-reflective urethane plate provides the same facet-side as the standard injection-molded-plate product. That is, unlike the laminated-sheet product, the retro-reflective urethane plate has a raised or topographic surface.

Use of a retro-reflective urethane plane sign mitigates a host of prior art engineering problems directly due to limitations such as structural fatigue of sign support structures, short service-life (and shelf-life) of laminated-sheet materials. Through the use of a retro-reflective urethane plate to make NHS signs and/or signals, flexure of the signs and/or signals is possible as the flexure of urethane may be designed into the signs. Flexure of signs, due to wind-loading, provides significant protection from structural fatigue for the signs' structural supports. The present invention takes advantage of urethane's natural characteristics to allow designed specific stiffness characteristics. Such stiffness characteristics: 1) allow for lesser-mass sign support structures resulting in safer roadside installations in addition to lower in-place costs of signage, 2) attentional attraction aspects of sign or signal face flexure, and 3) in the case of signs or signals that potentially can impact vehicle windshields in crashes, the signs or signals themselves can be flexible enough not to penetrate the windshields.

The flexure characteristic the retro-reflective plate of the present invention may also be used in the design of reflector highway sign or signal to stimulate human conscious awareness, by providing, to the human observer, unexpected flexure of the sign or signal. Such flexure of the sign is randomized due to the random nature of air mass vortex shedding by passing vehicles, cross-wind relative to the travelway, and the changing stiffness of urethane brought on by changes in ambient temperature and direct heating such as solar-gain.

Figure 6A:
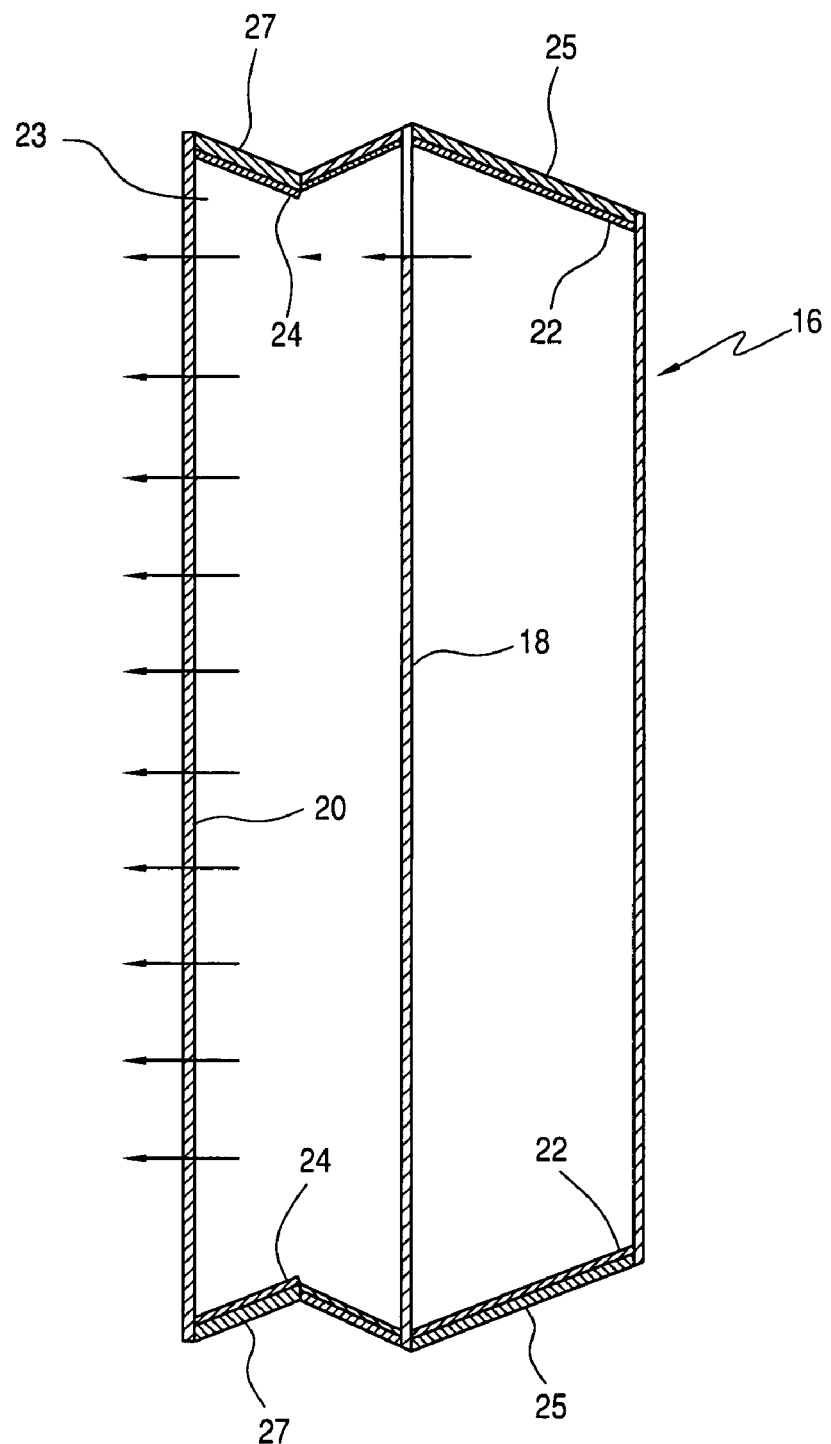
FIGS. 6A and 6B are schematic, fragmentary, cross-sectional views of an internally lighted light box utilizing the retro-reflective plate made in accordance with the present invention.
Figure 6B:
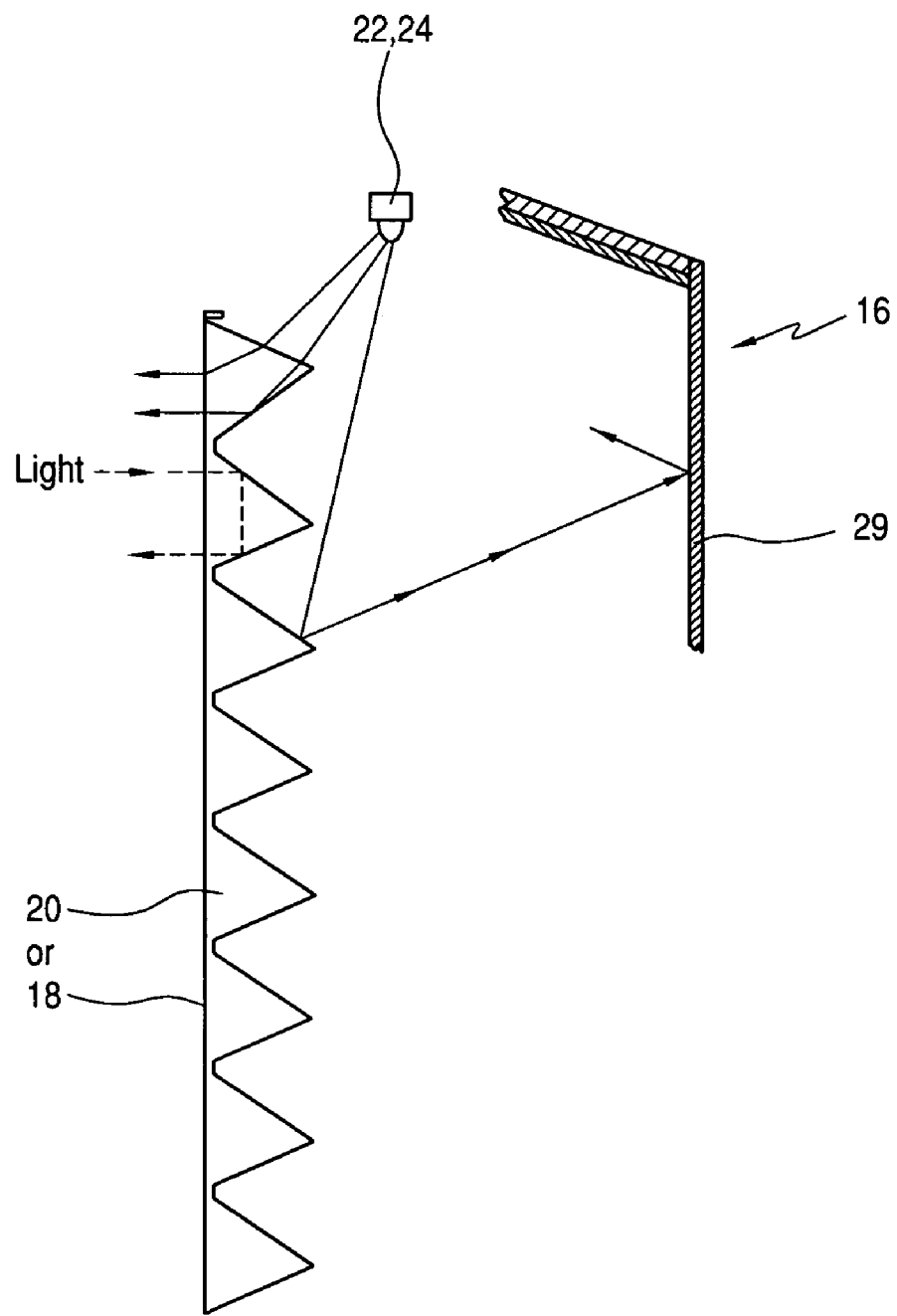

Prior art street-name-signs, and other related signage and signal devices, utilize either the laminated-sheet or the injection-molded plate materials. Both require extensive capital equipment to manufacture and relatively expensive machinery and skilled labor to fabricate into finished products. The retro-reflective urethane plate of the present invention provides the equivalent of laminated-sheet product without the use of structural substrate for support or skilled labor, while providing the superior service-life of injection-molded plate product but without the dimensional limitations of the prior art injection-molded plates, which are typically made in small sections or its associated skilled labor requirements. The retro-reflective urethane plate used to make a street-name-signs, whether externally or internally illuminated, provides a similar appearance to the public as prior art signs. The cube-corner surface of a retro-reflective urethane plate, unlike the laminated-sheet product, allows for partial-edge-lighting for internal illumination from point-source lighting such as LEDs. For example, referring to FIG. 6A, a light box 16 is disclosed, comprising retro-reflective urethane plates 18 and 20. LED arrays 22 and 24 are disposed along the side walls 25 and 27 of the light box. The opening 23 of the box is advantageously chamfered to prevent dark areas or shadows from forming on the surface of the plate 20 across the opening. FIG. 6B shows how light rays from an LED is directed to the face of the plate 18 or 20 via diffraction through the cube-corner elements and reflection from the rear wall 29.

Figure 7:
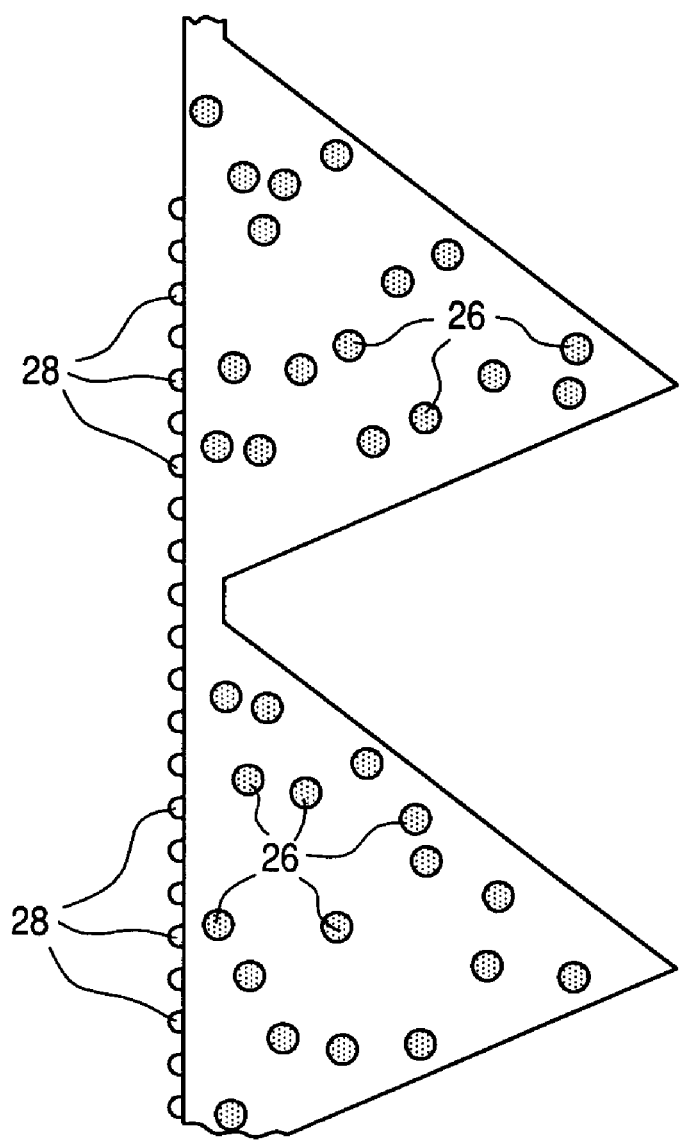
FIG. 7 is an embodiment of the cube-corner, retro-reflective plate of present invention, showing titanium dioxide disposed on its planar surface and fluorescent materials disposed within the cube-corner elements.

Referring to FIG. 7, the retro-reflective urethane plate can incorporate the inclusion in the urethane matrix of materials, such as phosphorus, generally indicated at 26, for conversions of non-visible (human) light energy to human visible wavelengths. Conversion of non-visible (to human) light energy to human visible wavelengths is carried into effect by forming the characters, ornaments and the like, of an advertising display or sign, wholly or in part only, of fluorescent material, and then exciting the material with ultra-violet light so as to cause it to fluoresce and become self-luminous. A source of ultra-violet light is arc lamp screened by a deeply colored cobalt glass globe or shade or a mercury vapor arc lamp.

Again referring to FIG. 6, the retro-reflective urethane plate can incorporate the use of titanium dioxide as a structural surface component, generally indicated at 28, which in the presence of ultra-violet radiation and moisture acts as a photo-catalyst to breakdown organic compounds and keep surfaces cleaner than otherwise. The retro-reflective urethane plate allows ultra-violet radiation which initially passes the titanium dioxide elements populating the surface to retro-reflect and potentially impact the titanium dioxide elements as it passes back out the sign box made of retro-reflective urethane plate. Further, when the retro-reflective urethane plate backlit with ultra-violet radiation, such as with sunlight or artificial ultra-violet sources, the radiation can also energize the surface mounted titanium dioxide. Use of titanium dioxide, which is opaque, on transparent surfaces should be less dense to allow more light pass-thru without reducing effectiveness as the ultra-violet radiation not initially engaged is retro-reflected back toward the titanium dioxide populated surface. Placement of the titanium dioxide particles on the retro-reflective urethane plate may accomplished during the casting phase of fabrication by taking advantage of the tacky surface of the urethane casting material.

The dimensionally large, seamless, cube-corner retro-reflective plates of the present invention when made with a material having the physical/chemical properties similar to urethane are easily structurally attached to each other to make very large multi-plates of varying flexibilities. As such, highly flexible dimensionally large, seamless, cube-corner reflective plates may be manufactured allowing for the plates to conform to a desired three-dimensional surface and still retain their retro-reflective properties.

It is well known that when light rays exist in a relatively dense optical medium, such as glass, which is surrounded by a relatively rare optical medium, such as air, these light rays will, when striking on the surface of separation between the two media at an angle with the surfaces of separation less than what is know as the critical angle, be totally reflected back into the denser medium. It is possible then to form the denser medium between two properly related surfaces which, as in the case of a sheet of glass would be substantially parallel, and to cause the light rays to enter the medium at a portion of its surface in such a way that when they are refracted at this surface into the medium they will then be transmitted through the medium in such direction that they will strike the interior surface of the medium at an angle less than the critical angle. They will then be totally reflected and travel off through this medium until they strike the opposite surface where they will again be totally reflected. By this series of reflections it is possible to cause the light rays to travel through the medium and practically none of them will escape into the rarer surrounding medium. If, however, any portion of the surface of the dense medium is treated by sandblasting or acid etching so as to destroy the regularity of its surface, the angles of the surface on the projections and irregularities caused by this treatment will be such that the light rays will strike against this surface at more than the critical angle, in which case they will be refracted out into the rarer medium.

Figure 8:
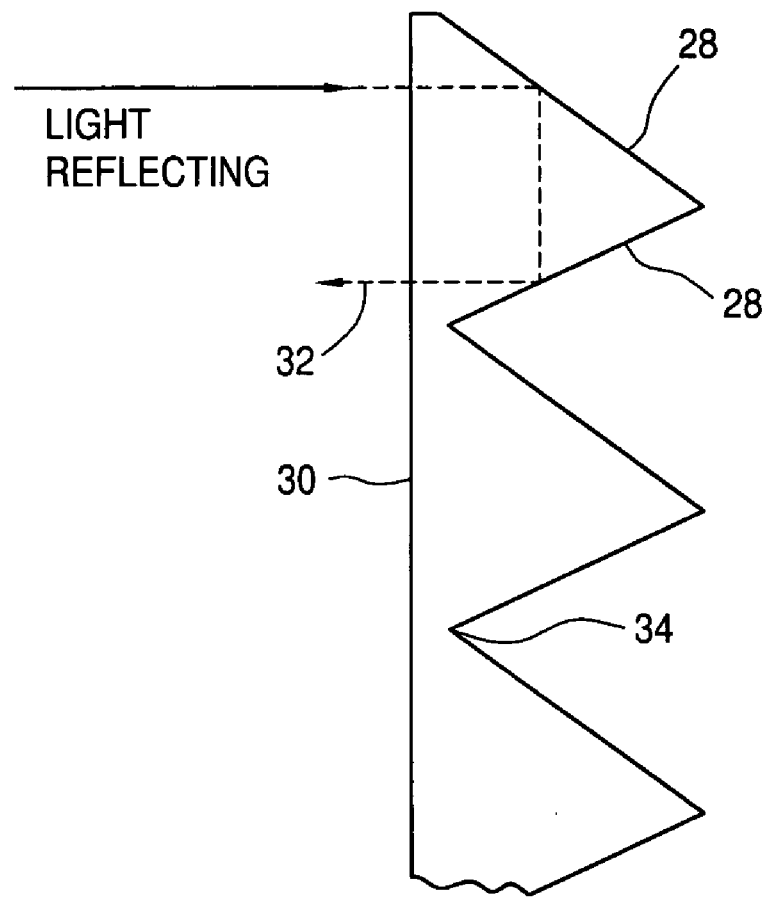
FIG. 8 is an enlarged portion of the cube-corner, retro-reflective plate.

Referring to FIG. 8, an enlarged cross-section of a cube-corner retro-reflective plate made in accordance with the present invention includes a plurality of facets 28 disposed at an angle to the plate's planar surface 30 so that light ray 32 hitting the planar surface at less than the critical angle enters the plate but will be reflected at the facets 28 back to the source. The boundary 34 between each cube-corner element is kept to a minimum since it non-reflecting.

While this invention has been described as having preferred design, it is understood that it is capable of further modification, uses and/or adaptations following in general the principle of the invention and including such departures from the present disclosure as come within known or customary practice in the art to which the invention pertains, and as may be applied to the essential features set forth, and fall within the scope of the invention or the limits of the appended claims.

I claim:

1. A cube-corner retro-reflecting plate material, comprising;
   a) a urethane plate having first and second opposite major surfaces;
   b) said first major surface is planar and said second major surface is formed with a plurality of cube corners each one of which has a plurality of facets;
   c) said facets being clouded to provide degraded retro-reflecting characteristics at less than those with clear facets, thereby diffusing light across said surfaces; and
   d) said first major surface including titanium dioxide.

2. A reflecting plate as in claim 1 wherein said facets are colored.

* * * * *